US012681030B2

(12) United States Patent
Mitsuyama et al.

(10) Patent No.: US 12,681,030 B2
(45) Date of Patent: Jul. 14, 2026

(54) NUCLEIC ACID ANALYSIS DEVICE

(71) Applicant: HITACHI HIGH-TECH CORPORATION, Tokyo (JP)

(72) Inventors: Toshifumi Mitsuyama, Tokyo (JP); Junji Ishizuka, Tokyo (JP); Hitoshi Miyata, Tokyo (JP); Tomohiro Shoji, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 793 days.

(21) Appl. No.: 17/918,447

(22) PCT Filed: May 27, 2020

(86) PCT No.: PCT/JP2020/020856
§ 371 (c)(1),
(2) Date: Oct. 12, 2022

(87) PCT Pub. No.: WO2021/240675
PCT Pub. Date: Dec. 2, 2021

(65) Prior Publication Data
US 2023/0136020 A1 May 4, 2023

(51) Int. Cl.
*G01N 35/02* (2006.01)
*G01N 35/10* (2006.01)
G01N 35/04 (2006.01)

(52) U.S. Cl.
CPC ....... *G01N 35/025* (2013.01); *G01N 35/1002* (2013.01); *G01N 35/02* (2013.01); *G01N 2035/0401* (2013.01); *G01N 2035/0441* (2013.01)

(58) Field of Classification Search
CPC .. G01N 35/025; G01N 35/1002; G01N 35/02; G01N 2035/0401; G01N 2035/0441
See application file for complete search history.

(56) References Cited

U.S. PATENT DOCUMENTS

2020/0070145 A1* 3/2020 Miura ............... B01L 3/502784

FOREIGN PATENT DOCUMENTS

| JP | S62035445 A | * | 2/1987 |
| JP | 2011-050344 A | | 3/2011 |
| JP | 2014194378 A | * | 10/2014 |
| JP | 5687514 B2 | | 3/2015 |
| JP | 6068227 B2 | | 1/2017 |

OTHER PUBLICATIONS

International Search Report, PCT/JP2020/020856 dated Aug. 18, 2020 (2 pgs.).

* cited by examiner

*Primary Examiner* — Benjamin R Whatley
(74) *Attorney, Agent, or Firm* — Volpe Koenig

(57) ABSTRACT

The present invention provides a nucleic acid analysis device that, even when a plurality of flow cells is handled, does not require an increase in the required movement amount, and can be reduced in size by reducing the size of a stage mechanism. This nucleic acid analysis device is characterized by having a sample container containing a nucleic acid sample to be analyzed, an imaging means for observing the nucleic acid sample, and a stage mechanism for moving the sample container, and is characterized in that the stage mechanism has two translation means and at least one rotation means, one of the two translation means is disposed on the upper surface of the rotation means, and the other is disposed on the lower surface of the rotation means.

19 Claims, 8 Drawing Sheets

[FIG. 1]
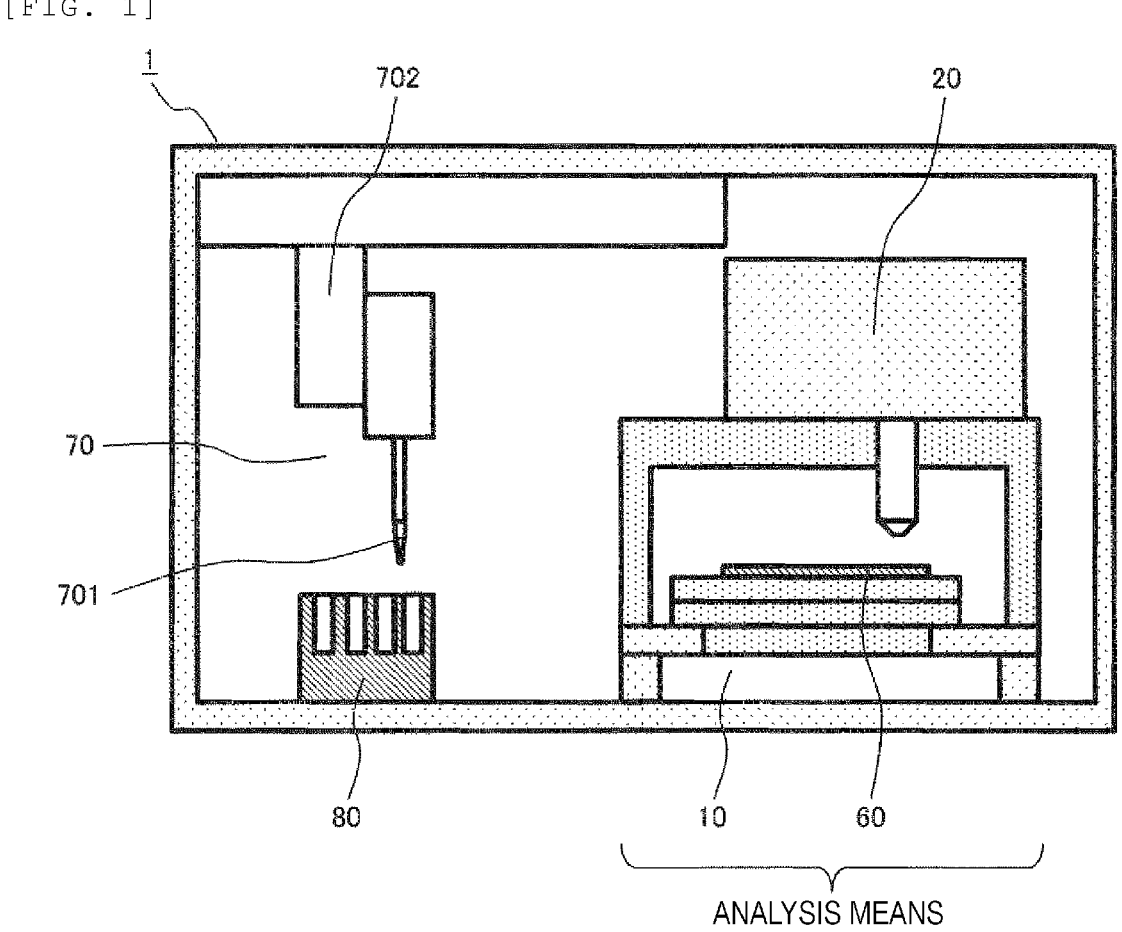
ANALYSIS MEANS

[FIG. 4]
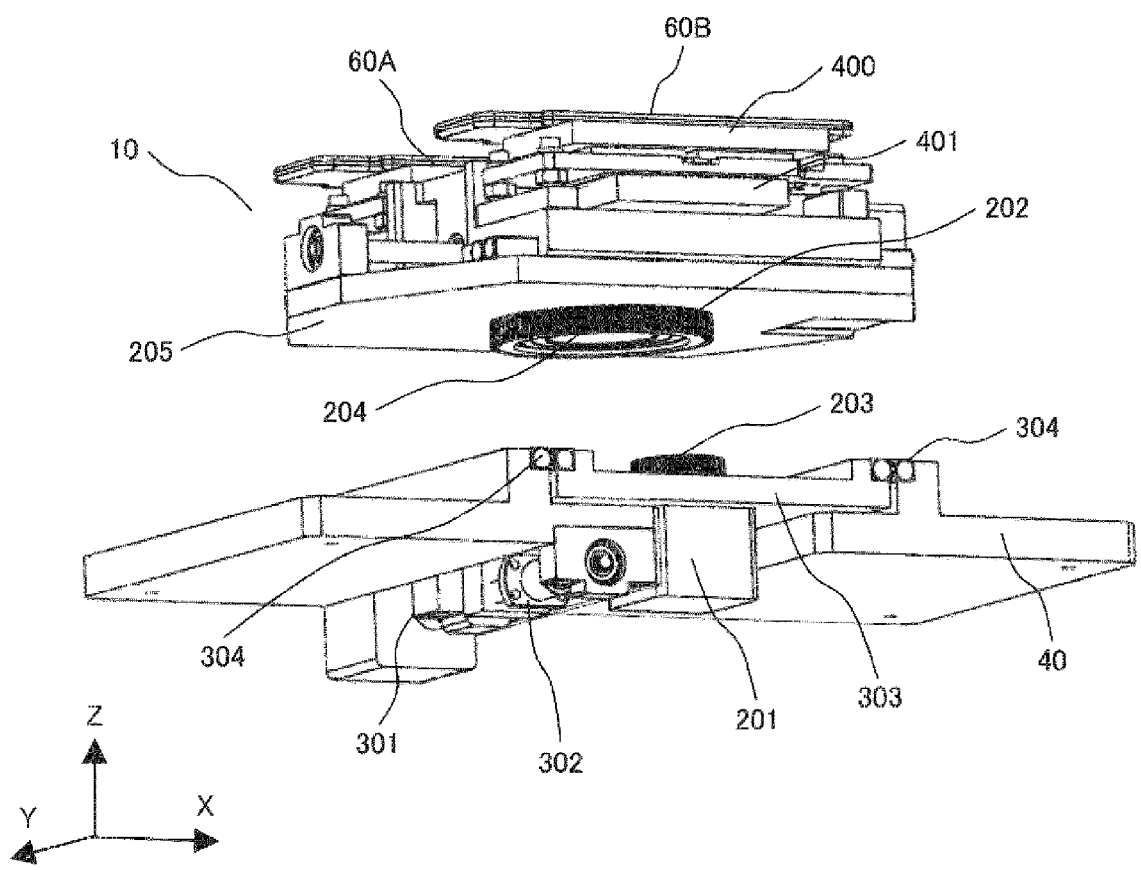

[FIG. 5]
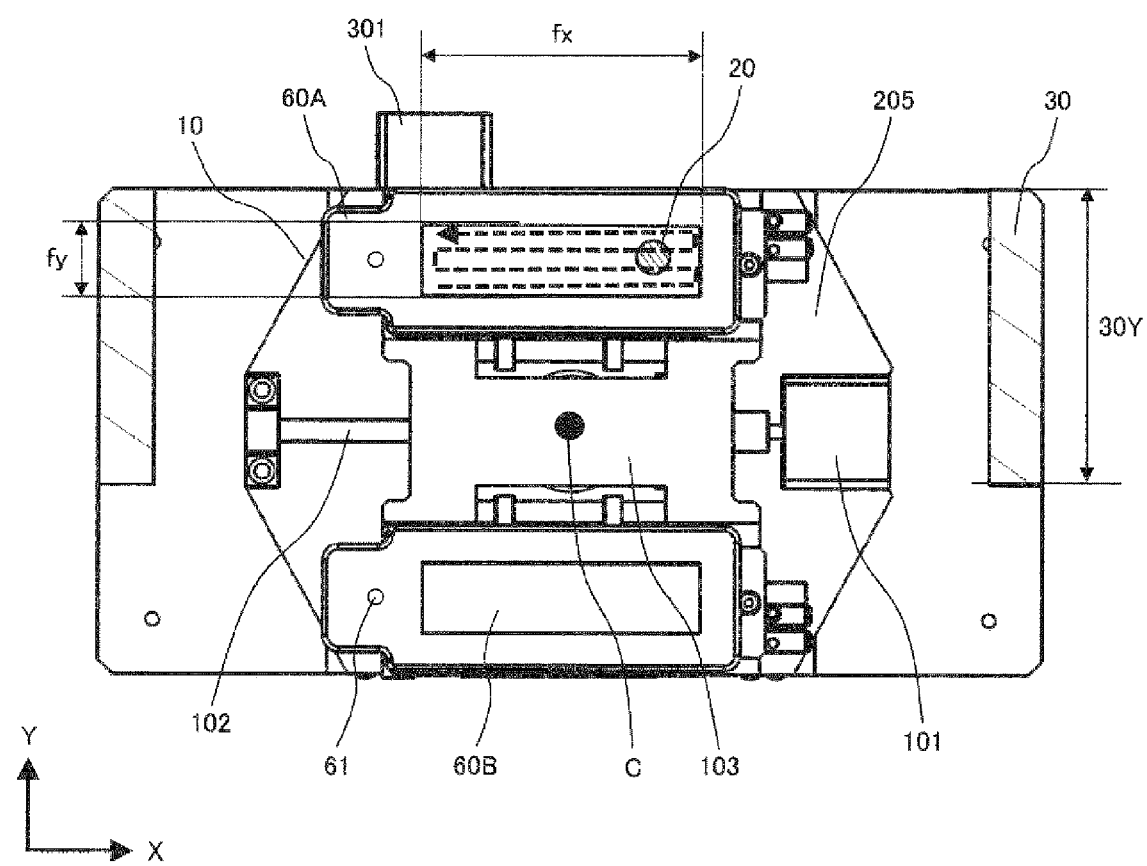

[FIG. 6]
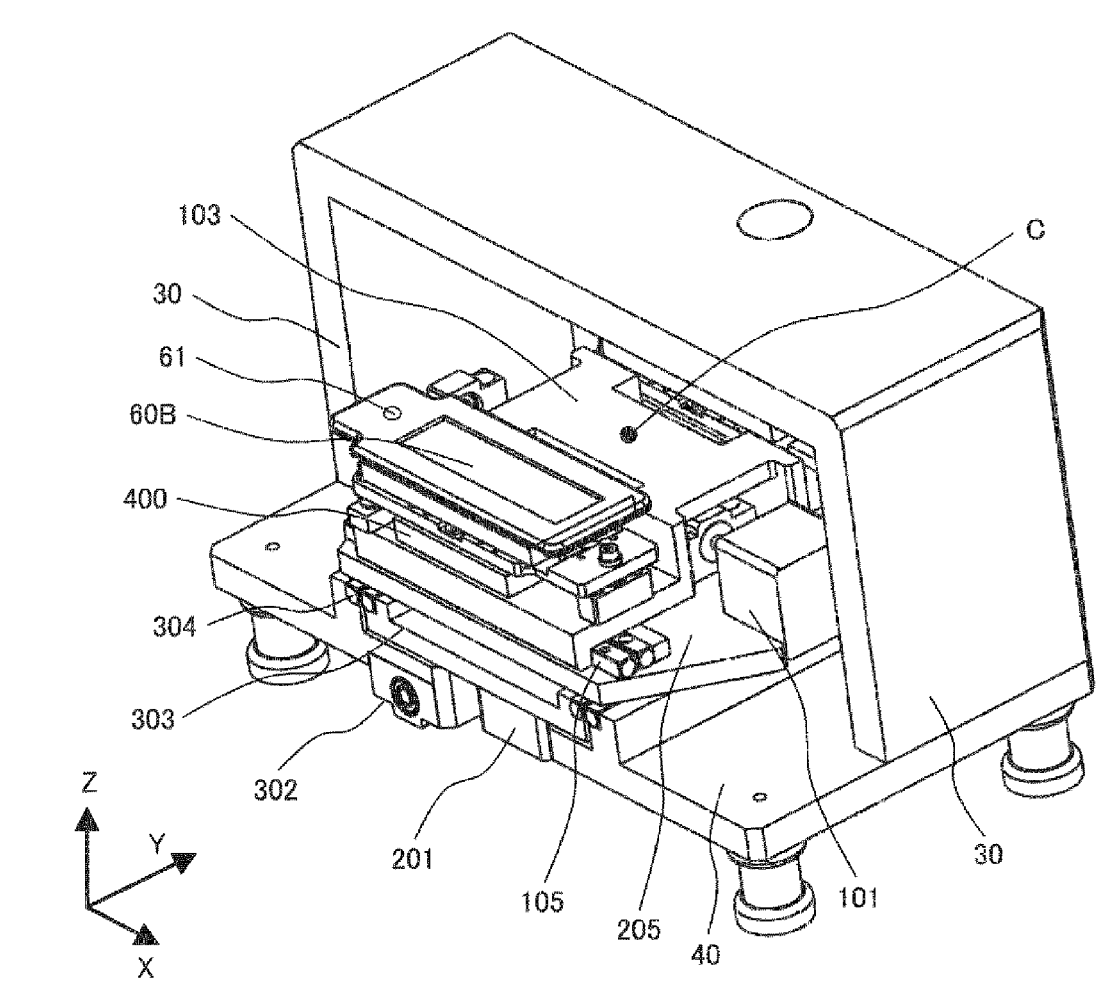
[FIG. 7]
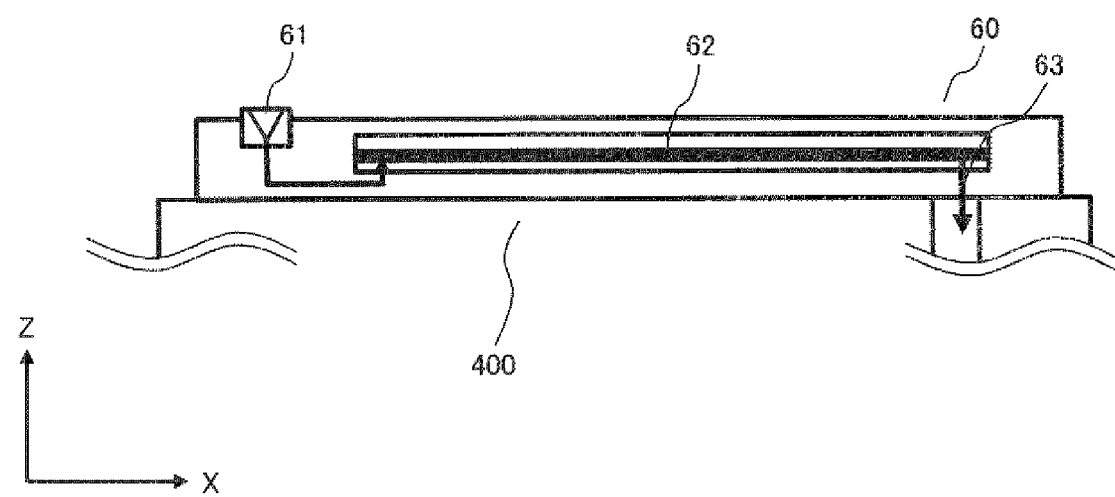

[FIG. 8]
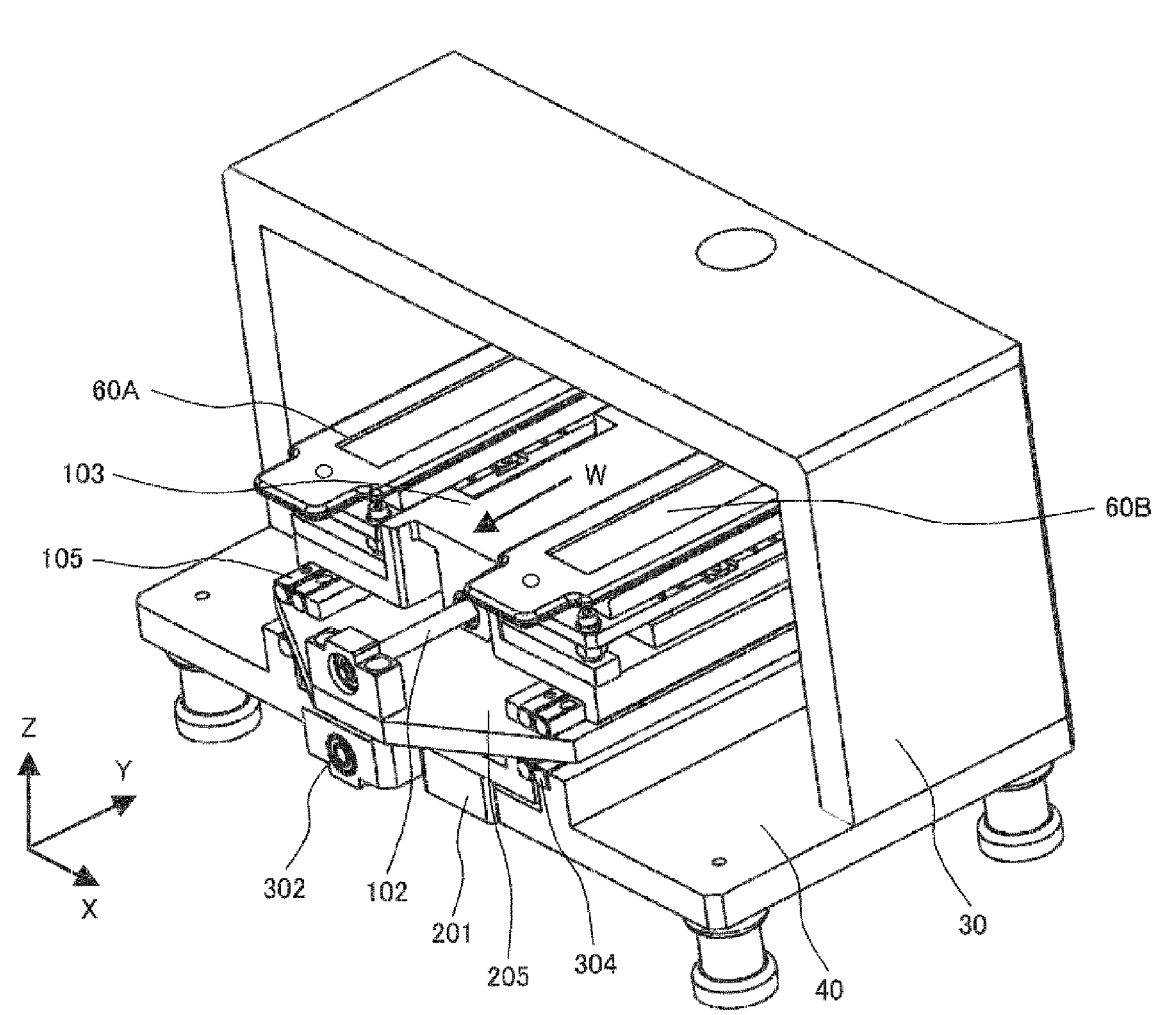

[FIG. 9]
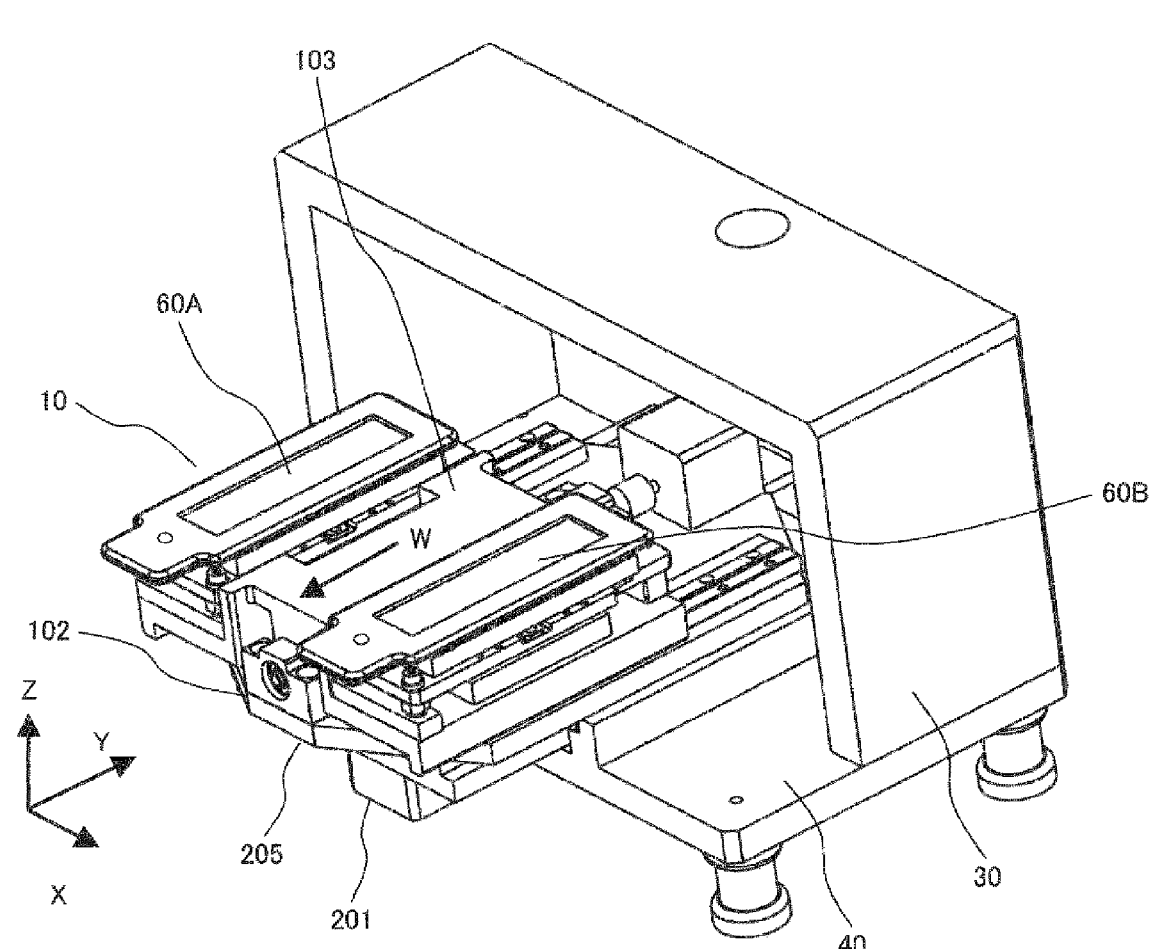

NUCLEIC ACID ANALYSIS DEVICE

TECHNICAL FIELD

The present invention relates to a nucleic acid analysis device used in order to identify the base sequence of a nucleic acid such as deoxyribonucleic acid (DNA) and ribonucleic acid (RNA). In particular, the present invention relates to a nucleic acid analysis device having a function of causing a reaction between a nucleic acid sample to be analyzed and a reagent and a function of optically detecting the nucleic acid sample or a reaction product thereof.

BACKGROUND ART

In recent years, in the field of nucleic acid analysis devices, a method has been proposed for using a flow cell, which is a sample container, carrying multiple DNA fragments to be analyzed on a flat substrate, and identifying in parallel the base sequences of the carried multiple DNA fragments.

In this method, a fluorescent dye-attached substrate corresponding to a base is introduced into the flow cell carrying the multiple DNA fragments, the flow cell is irradiated with excitation light, fluorescence generated from each DNA fragment is detected by an imaging means, and the base sequence is identified.

Further, in the nucleic acid analysis device, a complementary probe (nucleic acid fragment) obtained by fluorescently labeling a nucleic acid is extended by DNA polymerase or DNA ligase. The base sequences of multiple nucleic acids are identified in parallel by detecting fluorescence for each extension reaction.

In addition, in order to analyze a large amount of DNA fragments, an analysis region is usually divided into a plurality of detection fields, and the entire analysis region is analyzed while changing the detection field for each excitation light irradiation to identify the base sequence.

As a background art in this technical field, there is disclosed in JP-B-6068227 (PTL 1). Described in PTL 1 is a nucleic acid analysis device that has a dispensing nozzle suctioning and discharging a liquid, a nozzle drive unit moving the dispensing nozzle to a desired position, a liquid surface detection unit detecting a liquid surface by contact between a tip of the dispensing nozzle and the liquid surface, and a reaction unit having a flow path system having an injection port, a reaction flow path connected to the injection port, and a waste liquid flow path connected to the reaction flow path (see paragraph 0010).

In addition, as a background art in this technical field, there is disclosed in JP-B-5687514 (PTL 2). Described in PTL 2 is a nucleic acid sequence analysis device in which a refrigerant circulation-type temperature adjustment unit is mounted on a horizontal drive stage and the temperature adjustment unit adjusts a temperature of an installation surface of a flow cell to a predetermined temperature (see paragraph 0008).

CITATION LIST

Patent Literature

PTL 1: JP-B-6068227
PTL 2: JP-B-5687514

SUMMARY OF INVENTION

Technical Problem

PTL 1 describes a nucleic acid analysis device in which a flow cell is mounted on a stage that can be driven in two-dimensional directions in a horizontal plane. Likewise, PTL 2 describes a nucleic acid sequence analysis device (nucleic acid analysis device) in which a flow cell is mounted on a stage that can be driven in two-dimensional directions in a horizontal plane.

However, in the nucleic acid analysis devices described in PTL 1 and PTL 2, single translation means alone performs a unidirectional translational operation. Accordingly, in a case where, for example, a plurality of flow cells are handled, problems arise as a required movement amount increases, the stage becomes large, and the device becomes large.

In this regard, the present invention provides a nucleic acid analysis device with which a stage mechanism and the device can be reduced in size without an increase in the required movement amount even in a case where, for example, a plurality of flow cells are handled.

Solution to Problem

In order to solve the above problems, a nucleic acid analysis device of the present invention includes: a sample container containing a nucleic acid sample to be analyzed; an imaging means for observing the nucleic acid sample; and a stage mechanism moving the sample container, in which the stage mechanism has two translation means and at least one rotation means, one of the two translation means is installed on an upper surface of the rotation means, and the other is installed on a lower surface of the rotation means.

Advantageous Effects of Invention

According to the present invention, it is possible to provide a nucleic acid analysis device with which the stage mechanism and the device can be reduced in size without an increase in a required movement amount even in a case where, for example, a plurality of flow cells are handled.

It should be noted that problems, configurations, and effects other than those described above will be clarified by the description of the following example.

BRIEF DESCRIPTION OF DRAWINGS

FIG. 1 is an explanatory diagram illustrating a schematic configuration of a nucleic acid analysis device 1 described in Example 1.

FIG. 2 is a perspective view illustrating an analysis means of the nucleic acid analysis device 1 described in Example 1.

FIG. 3 is a perspective view in which a stage mechanism 10 described in Example 1 developed around a rotation means 200 is viewed from above.

FIG. 4 is a perspective view in which the stage mechanism 10 described in Example 1 developed around the rotation means 200 is viewed from below.

FIG. 5 is a top view illustrating an operation of the analysis means during imaging described in Example 1.

FIG. 6 is a perspective view illustrating the operation of the analysis means during imaging described in Example 1.

FIG. 7 is an explanatory diagram illustrating a schematic configuration of a sample container 60 described in Example 1.

FIG. 8 is a perspective view illustrating a state where a rotating table 205 is rotated by 90° during replacement of a nucleic acid sample described in Example 1.

FIG. 9 is a perspective view illustrating a state of each table after movement to a replacement position of the nucleic acid sample described in Example 1.

DESCRIPTION OF EMBODIMENTS

An example of the present invention will be described below with reference to the drawings. It should be noted that substantially identical or similar configurations are denoted by the same reference numerals and redundant description may be omitted. In addition, the present example is to specifically describe the present invention so that the present invention is described in an easy-to-understand manner in accordance with the principle of the present invention and does not limit the interpretation of the present invention.

In addition, although a DNA fragment is analyzed in the present example, RNA, protein, and so on as well as DNA may be analyzed and the present example can be used for bio-related substances in general.

Example 1

First, a schematic configuration of a nucleic acid analysis device 1 described in Example 1 will be described.

FIG. 1 is an explanatory diagram illustrating the schematic configuration of the nucleic acid analysis device 1 described in Example 1.

The nucleic acid analysis device 1 is a device for identifying (analyzing) the base sequence of a nucleic acid and has, as an analysis means, the analysis means having a function of causing a reaction between a nucleic acid sample to be analyzed and a reagent and a function of optically detecting the nucleic acid sample or a reaction product thereof.

Further, as for the nucleic acid analysis device 1, a rectangular sample container (flow cell) containing (enclosing) the nucleic acid sample is set, an operation of the device is started via a predetermined user interface having a display device or an input device such as a touch panel, nucleic acid analysis is automatically performed, and the base sequence is identified.

The nucleic acid analysis device 1 has, for base sequence identification, the analysis means having an imaging means 20 for observing (analyzing) the fluorescently labeled nucleic acid sample and a stage mechanism 10 moving a sample container 60 containing the nucleic acid sample to be analyzed.

It should be noted that at least two sample containers 60 (two sample containers in Example 1) are mounted on the stage mechanism 10 and the sample containers 60 are moved so that the entire analysis regions of the sample containers 60 are imaged (observed) or the sample containers 60 are replaced.

The nucleic acid analysis device 1 also has a reagent storage portion 80 where the reagent required for analysis (reagent for fluorescent labeling) is stored.

Further, the nucleic acid analysis device 1 has a liquid sending means 70 for sending the reagent from the reagent storage portion 80 to the sample container 60. The liquid sending means 70 has a dispensing nozzle 701 suctioning and discharging (dispensing) the reagent for fluorescently labeling the nucleic acid and an arm portion 702 moving the dispensing nozzle 701 to a desired position.

The nucleic acid analysis device 1 uses polymerase chain reaction (PCR) method to extend the base sequence of the nucleic acid. The PCR method is a technique with which the base sequence of a desired nucleic acid can be selectively amplified by controlling the temperature of a reaction solution in accordance with predetermined conditions. In order to carry out this technique, the nucleic acid analysis device 1 has a temperature adjustment mechanism (not illustrated) for reaction solution temperature control.

Next, the stage mechanism 10 and the imaging means 20 as the analysis means of the nucleic acid analysis device 1 described in Example 1 will be described.

Figure 2:
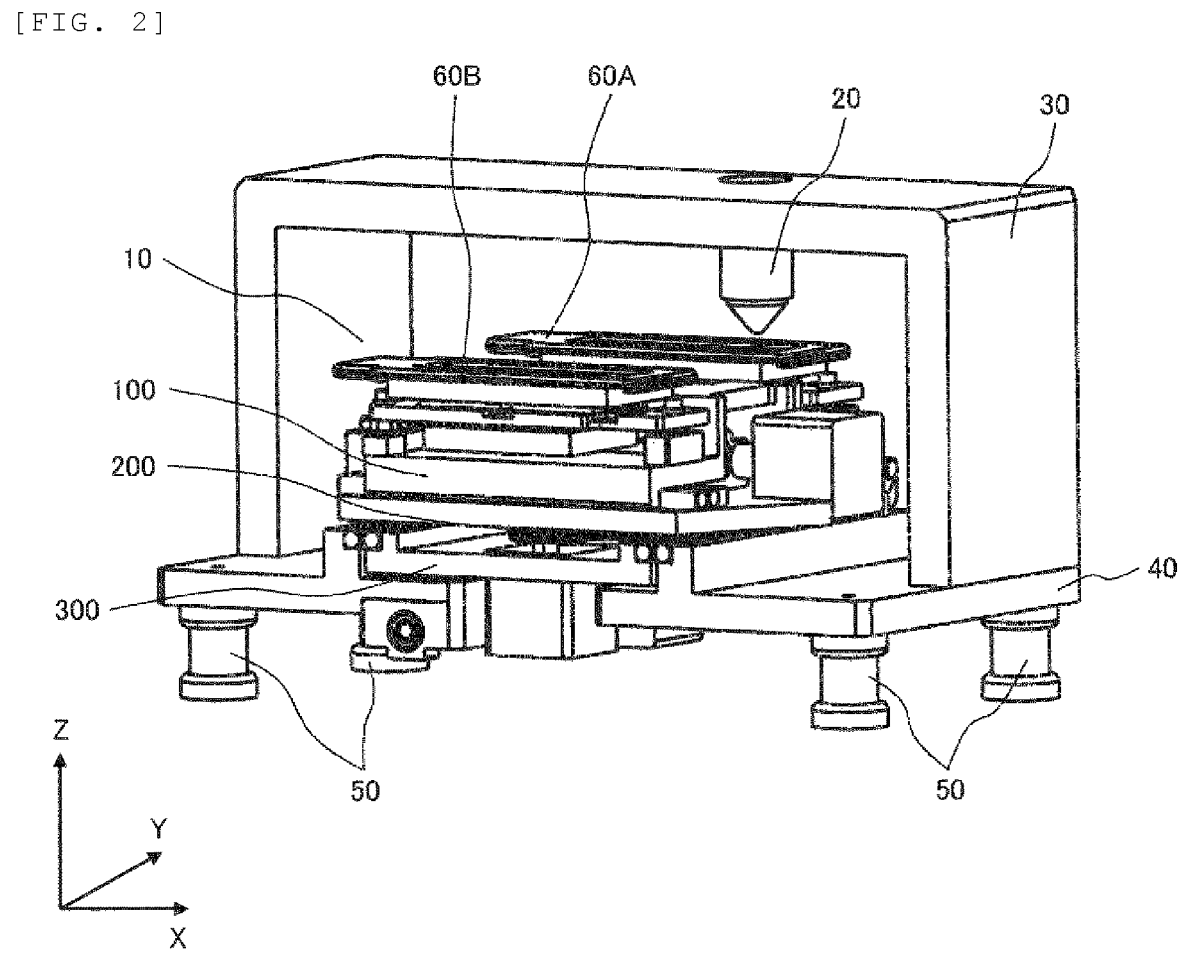

FIG. 2 is a perspective view illustrating the analysis means of the nucleic acid analysis device 1 described in Example 1.

The analysis means has the imaging means 20 for optically observing the fluorescently labeled nucleic acid sample, an optical base (optical support member) 30 holding (supporting) the imaging means 20, two sample containers 60A and 60B, the stage mechanism 10 transporting (moving) the two sample containers 60A and 60B, a stage base 40 holding the stage mechanism 10, and an anti-vibration mount 50 holding the weight of these components and blocking vibration from the outside.

An imaging range of the imaging means 20 is minute, and thus the nucleic acid analysis device 1 divides the analysis region of the sample container (flow cell) 60 into a plurality of detection fields and observes the entire analysis region while changing the detection field. Accordingly, the stage mechanism 10 is moved by a minute amount in an XY direction in FIG. 2 and local imaging is repeated. As a result, the entire analysis region can be observed.

The stage mechanism 10 has a first translation means 100 installed on an upper surface of a rotation means 200 and a second translation means 300 installed on a lower surface of the rotation means 200.

The second translation means 300 has a translation table displaced relative to a base portion (stage base 40) fixing the whole, a translation slider smoothly supporting the translation table, a drive means, such as a motor, for generating power for translational movement, and a linear motion mechanism, such as a ball screw, transmitting the power of the drive means.

The rotation means 200 has a base portion (translation table of the second translation means 300), a rotating table displaced in a rotational direction relative to the base portion, a rotating slider, such as a cross roller bearing, smoothly supporting the rotating table, a drive means, such as a motor, for generating power for rotational movement, and a gear mechanism transmitting the power of the drive means. It should be noted that one rotation means 200 is installed in Example 1.

The first translation means 100 has a base portion (rotating table of the rotation means 200), a translation table displaced relative to the base portion and moving an object to be loaded (such as the sample container 60), a translation slider smoothly supporting the translation table, a drive means, such as a motor, for generating power for translational movement, and a linear motion mechanism, such as a ball screw, transmitting the power of the drive means.

The imaging means 20 has an imaging element such as a CCD or CMOS image sensor (not illustrated), a light source, such as a xenon lamp (not illustrated), connected to the imaging element, and an optical lens (not illustrated) collecting excitation light emitted from the light source.

Further, the imaging means 20 detects fluorescence generated from the nucleic acid sample (DNA fragment) held in a reaction flow path of the sample container 60 by irradiating the sample container 60 with excitation light from the light source.

The two sample containers 60A and 60B are generally referred to as flow cells, in which the nucleic acid sample (DNA fragment) is fixed and a reagent flow path is formed.

In addition, the nucleic acid analysis device 1 has the liquid sending means 70 for introducing a fluorescent dye-attached substrate corresponding to the nucleic acid into the two sample containers 60A and 60B for fluorescent labeling and causing a reagent for a base extension reaction to flow.

It should be noted that although the liquid sending means 70 in Example 1 is a so-called dispensing mechanism having the dispensing nozzle 701 and the arm portion 702 moving the dispensing nozzle 701 to a desired position, the reagent may be directly sent by a pump to the two sample containers 60A and 60B with a pipe installed in the liquid sending means 70.

In this manner, the nucleic acid analysis device 1 has the sample container 60 containing the nucleic acid sample to be analyzed, the imaging means 20 for observing the nucleic acid sample, and the stage mechanism 10 moving the sample container 60, in which the stage mechanism 10 has two translation means (100 and 300) and at least one rotation means 200, one of the two translation means (100 and 300) is installed on the upper surface of the rotation means 200, and the other is installed on the lower surface of the rotation means 200.

As a result, even in a case where a plurality of the sample containers 60 are handled, the stage mechanism 10 and the device can be reduced in size without an increase in a required movement amount.

It should be noted that the following four movements are required for the stage mechanism 10.

(1) Movement for changing the detection field in order to observe the entire analysis region of the sample container 60, (2) Movement for switching an observation target between the two sample containers 60A and 60B, (3) Movement of the sample container 60 into an operation range of the dispensing mechanism in injecting the reagent for fluorescent labeling, and (4) Movement for replacing the sample container 60 after observation completion.

According to Example 1, the stage mechanism 10 and the device can be reduced in size without an increase in the required movement amount even in these movements.

In addition, the nucleic acid analysis device 1 uses the sample container 60, carries the nucleic acid sample to be analyzed on a flat substrate, and identifies the nucleic acid base sequence of the nucleic acid sample in parallel.

Further, the fluorescent dye-attached substrate is introduced into the nucleic acid in the sample container 60 (for fluorescent labeling reaction), the sample container 60 is irradiated with excitation light, and the fluorescence generated from each nucleic acid sample (DNA fragment) is detected by the imaging means 20 (fluorescence observation).

At this time, the fluorescent dye-attached substrate is introduced into the nucleic acid and a complementary probe (nucleic acid fragment) obtained by fluorescently labeling the nucleic acid is subjected to DNA base extension (amplification) by DNA polymerase or DNA ligase (extension reaction).

As a result, fluorescence is detected for each extension reaction and the base sequences of multiple nucleic acids are identified in parallel.

In addition, the analysis region is divided into a plurality of detection fields, and the entire analysis region is analyzed while changing the detection field for each excitation light irradiation to identify the base sequence.

Then, a new fluorescent dye-attached substrate is introduced using a new extension reaction, and the entire analysis region is analyzed and base sequence identification is performed by the same procedure as above. Base sequence identification can be efficiently performed by repeating this.

Next, the rotation means 200 of the stage mechanism 10 described in Example 1 developed around a rotating table 205 will be described.

Figure 3:
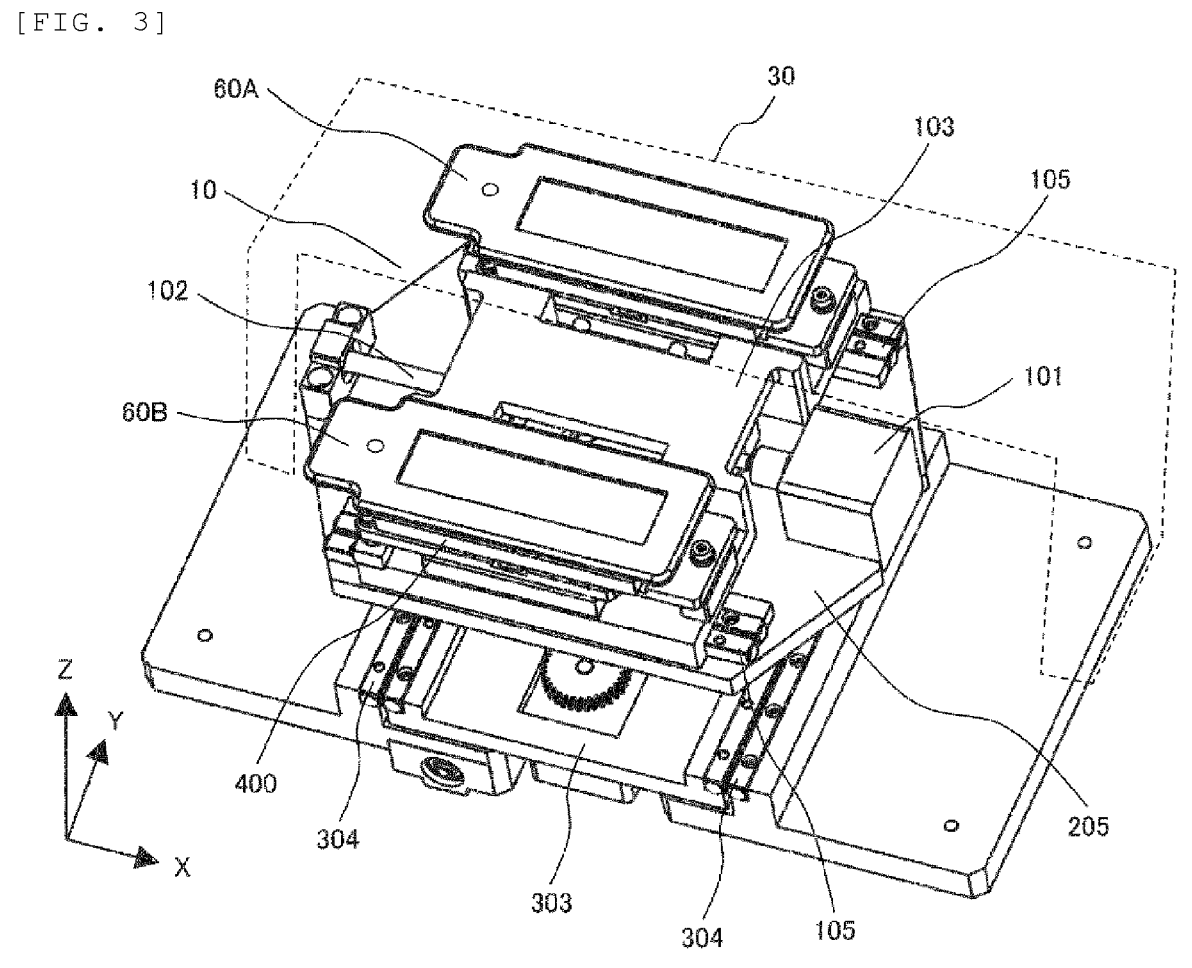

FIG. 3 is a perspective view in which the stage mechanism 10 described in Example 1 developed around the rotation means 200 is viewed from above.

FIG. 4 is a perspective view in which the stage mechanism 10 described in Example 1 developed around the rotation means 200 is viewed from below.

The stage mechanism 10 has, as the first translation means 100, a base portion (rotating table 205), a first translation table 103 displaced relative to the base portion, allowing sample containers 60A and 60B to be installed, and moving the sample containers 60A and 60B, a first translation slider 105 smoothly supporting the first translation table 103, a first drive motor 101 as a drive means, such as a motor, for generating power for translational movement, and a first linear motion mechanism 102, such as a ball screw, transmitting the power of the first drive motor 101.

The first translation table 103 is translated by the first linear motion mechanism 102 and the first drive motor 101.

Further, the first translation means 100 moves in an X-axis direction in FIG. 3 and has a translational region where at least the analysis region of the sample container 60A is observed.

In addition, the stage mechanism 10 has, as the rotation means 200, a base portion (second translation table 303), the rotating table 205 displaced in a rotational direction relative to the base portion (rotating table 205 rotationally displaced around a rotation center), a rotating slider 204, such as a cross roller bearing, smoothly supporting the rotating table 205, a rotary motor 201 as a drive means, such as a motor, for generating power for rotational movement, and a first gear 202 and a second gear 203 as gear mechanisms transmitting the power of the drive means.

The rotating table 205 is rotationally moved by the first gear 202, the second gear 203, and the rotary motor 201.

Further, the rotation means 200 has a rotational movement region rotating by at least 180° in order to switch the positions of the sample container 60A and the sample container 60B.

Here, as for the stage mechanism 10, the rotating table 205 serves as the base portion of the first translation means 100, and the rotating table 205 and the base portion of the first translation means 100 are identical for thickness-direction dimension suppression and component count reduction.

In other words, the first translation table 103 is directly connected to the rotating table 205 via the first translation slider 105. As a result, a direction of movement of the first translation means 100 can be changed by the rotation means 200.

The stage mechanism 10 has, as the second translation means 300, the second translation table 303 displaced relative to the base portion (stage base 40) and moving the sample container 60A and the sample container 60B, a second translation slider 304 smoothly supporting the second translation table 303, a second drive motor 301 as a drive means, such as a motor, for generating power for translational movement, and a second linear motion mechanism 302, such as a ball screw, transmitting the power of the second drive motor 301.

The second translation table 303 is translated by the second linear motion mechanism 302 and the second drive motor 301.

Further, the second translation means 300 moves in a Y-axis direction in FIG. 3 and has a translational region where at least the analysis region of the sample container 60A is observed.

Here, as for the stage mechanism 10, the second translation table 303 serves as the base portion of the rotation means 200, and the second translation table 303 and the base portion of the rotation means 200 are identical for thickness-direction dimension suppression and component count reduction.

In other words, the rotating table 205 is directly connected to the second translation table 303 via the rotating slider 204. As a result, a direction of movement of the second translation means 300 can be changed by the rotation means 200.

The stage mechanism 10 also has a temperature control unit (temperature adjustment mechanism) 400 heating and cooling the sample container 60A and the sample container 60B where nucleic acid injection occurs for observation. It should be noted that the temperature control unit 400 is installed in each of the sample container 60A and the sample container 60B.

The temperature control unit 400 is also used as an installation table for the sample container 60A and the sample container 60B where a reaction solution is injected and is used to adjust the temperatures of the sample container 60A and the sample container 60B to appropriate reaction or observation temperatures.

In addition, the temperature control unit 400 has a Peltier element inside and is capable of adjusting the temperatures of the sample container 60A and the sample container 60B to appropriate reaction or observation temperatures. In addition, the temperature control unit 400 has a heat sink 401 for cooling the Peltier element. The heat sink 401 is configured by a highly conductive metal block. A flow path used for refrigerant liquid (such as pure water and antifreeze) circulation is formed in the heat sink 401.

As a result, the nucleic acid analysis device 1 is capable of performing fluorescence observation in one sample container 60 and performing extension and fluorescent labeling reactions in the other sample container 60, and is capable of improving the throughput of the device. In addition, the nucleic acid analysis device 1 is capable of increasing an amount of nucleic acid samples to be analyzed by the two sample containers 60A and 60B being installed.

According to Example 1, in the nucleic acid analysis device 1 with the rotation means 200, directions of movement of the two translation means (100 and 300) installed on the upper and lower surfaces of the rotation means 200 can be the same and the two translation means (100 and 300) can be moved in the same direction.

As a result, in the nucleic acid analysis device 1, an operation of moving the sample container 60 in a predetermined direction can be realized by two translation means (100 and 300). Accordingly, in the nucleic acid analysis device 1, a required movement amount of each translation means (100 and 300) decreases. Further, each translation means (100 and 300) can be reduced in size and the nucleic acid analysis device 1 can be reduced in size.

In addition, in the nucleic acid analysis device 1, the observation target can be switched between the two sample containers 60A and 60B by rotation. As a result, there is no need to ensure a region for retracting a non-observation target sample container and the analysis means can be reduced in size.

Next, an operation of the analysis means during imaging (at the time of sample analysis or observation) described in Example 1 will be described.

FIG. 5 is a top view illustrating the operation of the analysis means during imaging described in Example 1.

FIG. 6 is a perspective view illustrating the operation of the analysis means during imaging described in Example 1.

The nucleic acid analysis device 1 performs imaging of the sample container 60A (nucleic acid (base) fluorescence observation) in the sample container 60A, which is one of the two installed sample containers 60 (mounted on the translation means 100 installed on the upper surface of the rotation means 200), and performs nucleic acid (base) extension and fluorescent labeling reactions in the other sample container 60B.

In the nucleic acid analysis device 1, with regard to the sample container 60A, the stage mechanism 10 is moved in the X and Y directions as indicated by a dotted arrow so that the analysis region indicated by fx and fy in FIG. 5 is observed in whole (whole-region imaging).

Here, the rotating table 205 is stopped at a position where the first translation table 103 can be moved in the X direction in FIG. 5.

Further, in this state, the sample container 60A is moved in the X direction by the first translation means 100 and in the Y direction by the second translation means 300.

The nucleic acid analysis device 1 repeats the imaging processing N times for each detection field of the imaging means 20. Here, N is the number of detection fields. The detection field corresponds to each region when the analysis region (whole) is divided into N. A two-dimensional sensor is capable of observing (detecting) the size of the detection field by single fluorescence observation, and the size is set by the design of an optical system.

The nucleic acid analysis device 1 sequentially repeats moving and stopping the N detection fields by the first translation means 100 and the second translation means 300 so that the sample container 60A is aligned with the position where excitation light is emitted from the imaging means 20 (light source) and imaging is performed by the imaging means 20 for a predetermined exposure time.

The nucleic acid analysis device 1 performs imaging in the sample container 60A, which is one of the two installed sample containers 60, and performs extension and fluorescent labeling reactions in the other sample container 60B.

The reagents used for the extension and fluorescent labeling reactions may be injected into the sample container 60 using the dispensing mechanism as described above or may be sent to the sample solution 60 using a pipe and a pump. It should be noted that here, the reaction solution (reagent) is injected into the sample container 60 by the dispensing mechanism.

An upper surface of the sample container 60 is provided with an injection port 61 for reagent injection by the dispensing mechanism (dispensing nozzle 701).

In addition, a width 30Y of an optical base 30 and a rotation center C of the rotating table 205 in the nucleic acid analysis device 1 are set such that the dispensing mechanism is capable of accessing the sample container 60B from above. In other words, the sample container 60B (sample container 60B where extension and fluorescent labeling reactions are performed) is installed at a position exposed from the optical base 30 and outside the width 30Y of the optical base 30.

In other words, the optical base 30 is installed such that an upper portion of one sample container 60 of the two sample containers 60A and 60B mounted on the stage mechanism 10 is opened.

As a result, the reagent can be directly injected into the injection port 61 of the sample container 60B by the dispensing mechanism.

Next, a schematic configuration of the sample container 60 described in Example 1 will be described.

FIG. 7 is an explanatory diagram illustrating the schematic configuration of the sample container 60 described in Example 1.

The upper surface of the sample container 60 is provided with the injection port 61 for reagent injection by the dispensing mechanism. The injection port 61 has an inclined surface and guides the dispensing mechanism (dispensing nozzle 701) when the dispensing mechanism is inserted.

A reagent injected from the injection port 61 flows through a nucleic acid sample-fixed flow path 62 and filling (injection) occurs inside. Then, when the reagent is replaced, by injecting a next reagent from the injection port 61, the already filled reagent is pushed out and discharged to the outside from a discharge port 63.

Here, the movement of the sample container 60B to a dispensing region is performed by positioning the stage mechanism 10 in an XY plane. When the dispensing of the reagent is completed, the temperature control unit 400 of the sample container 60B controls an amount of current supplied to the Peltier element therein and controls the temperature of the sample container 60B to a temperature suitable for an extension reaction by the reagent.

Then, imaging is performed in one sample container 60A and extension and fluorescent labeling reactions are performed in the other sample container 60B.

After these are completed, the rotary motor 201 is rotated and the rotating stage 205 is rotated by 180° for imaging in the other sample container 60B. As a result of this rotation, the sample container 60B moves to a position where the sample container 60B can be imaged by the imaging means 20 and the sample container 60A moves to a position where the reagent can be dispensed by the dispensing mechanism.

At this time, the sample container 60A is installed at a position exposed from the optical base 30 and outside the width 30Y of the optical base 30 such that the dispensing mechanism is capable of accessing the sample container 60A from above.

In this manner, the positions of the two sample containers 60A and 60B are switched mutually, and imaging and extension and fluorescent labeling reactions are respectively performed. This is performed a required number of times, the nucleic acid sample is observed, and the base sequence is identified.

In this manner, the nucleic acid analysis device 1 is capable of switching the observation target between the two sample containers 60A and 60B by rotation. As a result, there is no need to ensure a region for retracting the non-observation target sample container, which is required in a translational operation by a simple combination of translation means, and the analysis means can be reduced in size.

Finally, a state of each table after the rotating table 205 is rotated by 90° and moved to a replacement position of the nucleic acid sample during replacement of the nucleic acid sample described in Example 1 will be described.

FIG. 8 is a perspective view illustrating the state where the rotating table 205 is rotated by 90° during the replacement of the nucleic acid sample described in Example 1.

FIG. 9 is a perspective view illustrating the state of each table after the movement to the replacement position of the nucleic acid sample described in Example 1.

After the observation of the two sample containers 60A and 60B is completed, a worker moves the sample container 60 to a position where the sample container 60 can be accessed in order to remove the sample container 60 and replace the sample container 60 with a new sample container 60 to be analyzed next.

Here, an accessible position is a position in a W direction in FIGS. 8 and 9 where both the sample container 60A and the sample container 60B are exposed from the optical base 30.

During the observation, directions of the first translation slider 105 and the second translation slider 304 are orthogonal to each other (see, for example, FIG. 3). During the replacement, the rotating table 205 is rotated and, as a result, as illustrated in FIG. 8, the directions of the first translation slider 105 of the first translation means 100 and the second translation slider 304 of the second translation means 300 are matched such that both the first translation table 103 and the second translation table 303 are movable in the W direction in FIG. 8.

In other words, in the nucleic acid analysis device 1, the two translation means (100 and 300) are orthogonal to each other during the observation and the directions of movement of the two translation means (100 and 300) are the same during the replacement.

After that, as illustrated in FIG. 9, the rotating table 205 and the first translation means 100 are moved in the W direction in FIG. 9 by the second translation means 300 and, further, the first translation table 103 is moved in the W direction in FIG. 9 by the first translation means 100.

In other words, during the replacement, the two sample containers 60A and 60B mounted on the first translation table 103 of the translation means 100 installed on the upper surface of the rotation means 200 are completely exposed from the optical base 30.

As a result, the sample container 60A and the sample container 60B are completely exposed to the outside of the optical base 30, and the worker can replace the sample container 60.

In this manner, the nucleic acid analysis device 1 moves the sample container 60 with two translation means (100 and 300). As a result, the nucleic acid analysis device 1 is capable of reducing the required movement amount of each translation means (100 and 300).

Further, in the nucleic acid analysis device 1 with the rotation means 200, the directions of movement of the two translation means (100 and 300) installed on the upper and lower surfaces of the rotation means 200 can be the same and the two translation means (100 and 300) can be moved in the same direction.

As a result, in the nucleic acid analysis device 1, the operation of moving the sample container 60 in a predetermined direction can be realized by two translation means (100 and 300). Accordingly, in the nucleic acid analysis device 1, the required movement amount of each translation means (100 and 300) can be reduced. Further, each translation means (100 and 300) can be reduced in size and the nucleic acid analysis device 1 can be reduced in size.

It should be noted that the present invention includes various modification examples without being limited to Example 1 described above. For example, the above Example 1 has been specifically described so that the present invention is described in an easy-to-understand manner and is not necessarily limited to having every described configuration.

In addition, although Example 1 has been described so that those skilled in the art can implement the present invention, other embodiments are also possible and changes in configuration and various element replacements are possible without departing from the scope and spirit of the technical concept of the present invention. Accordingly, the description of the claims should not be construed as being limited to the description of Example 1.

REFERENCE SIGNS LIST

1: nucleic acid analysis device
10: stage mechanism
20: imaging means
30: optical base
40: stage base
50: anti-vibration mount
60: sample container
70: liquid sending means
100: first translation means
101: first drive motor
102: first linear motion mechanism
103: first translation table
105: first translation slider
200: rotation means
201: rotary motor
202: first gear
203: second gear
204: rotating slider
205: rotating table
300: second translation means
301: second drive motor
302: second linear motion mechanism
303: second translation table
304: second translation slider
400: temperature control unit
401: heat sink
701: dispensing nozzle
702: arm portion

The invention claimed is:

1. A nucleic acid analysis device comprising:
a first sample container and a second sample container each containing a nucleic acid sample;
imaging means for observing the nucleic acid sample;
an optical base on which the imaging means is disposed; and
a stage mechanism for moving the first sample container and the second sample container,
wherein the stage mechanism comprises first translation means, second translation means, and at least one rotation means, the first translation means being installed on an upper surface of the rotation means and the second translation means being installed on a lower surface of the rotation means,
wherein, in an observation state in which one of the first sample container and the second sample container is observed by the imaging means, a translation direction of the first translation means and a translation direction of the second translation means are orthogonal to each other,
wherein the rotation means is configured to rotate such that, in a replacement state for replacing the first sample container and the second sample container, the translation direction of the first translation means and the translation direction of the second translation means are aligned so that the first translation means and the second translation means move the first sample container and the second sample container in the aligned direction,
wherein, in the replacement state, the first sample container and the second sample container are completely exposed from the optical base, and
wherein the rotation means comprises a rotating table, and wherein the rotation means is configured to rotate the rotating table by at least 180 degrees to switch positions of the first sample container and the second sample container.

2. The nucleic acid analysis device according to claim 1, wherein the first translation means comprises a base portion and a translation table,
the rotation means comprises a rotating table, and
the rotating table serves as the base portion of the first translation means.

3. The nucleic acid analysis device according to claim 1, wherein the rotation means comprises a base portion and a rotating table,
the second translation means comprises a translation table, and
the translation table of the second translation means serves as the base portion of the rotation means.

4. The nucleic acid analysis device according to claim 1, wherein the first sample container and the second sample container are mounted on the first translation means.

5. The nucleic acid analysis device according to claim 4, wherein imaging is performed in the first sample container and extension and fluorescent labeling reactions are performed in the second sample container.

6. The nucleic acid analysis device according to claim 5, wherein, while the extension and fluorescent labeling reactions are performed in the second sample container, the second sample container is exposed from the optical base.

7. The nucleic acid analysis device according to claim 5, further comprising:
a reagent dispensing nozzle; and
an arm portion moving the reagent dispensing nozzle to a desired position.

8. The nucleic acid analysis device according to claim 7, further comprising a reagent storage portion storing a reagent required for analysis.

9. The nucleic acid analysis device according to claim 1, wherein each of the first sample container and the second sample container has a reagent flow path.

10. The nucleic acid analysis device according to claim 1, wherein the rotation means comprises a rotating table, and wherein the rotation means is configured to rotate the rotating table by about 90 degrees to transition between the observation state and the replacement state.

11. The nucleic acid analysis device according to claim 1, wherein the rotation means comprises a rotating slider supporting a rotating table, and wherein the rotating slider comprises a cross roller bearing.

12. The nucleic acid analysis device according to claim 1, wherein the first translation means comprises a first linear motion mechanism including a ball screw, and wherein the second translation means comprises a second linear motion mechanism including a ball screw.

13. A nucleic acid analysis device comprising:
a first sample container and a second sample container each containing a nucleic acid sample;

a camera that captures an image of the nucleic acid sample;

an optical base on which the camera is disposed; and a stage that moves the first sample container and the second sample container, wherein the stage comprises a first translation mechanism, a second translation mechanism, and a rotation mechanism, the first translation mechanism being installed on an upper surface of the rotation mechanism and the second translation mechanism being installed on a lower surface of the rotation mechanism, wherein, in an observation state in which one of the first sample container and the second sample container is imaged by the camera, a translation direction of the first translation mechanism and a translation direction of the second translation mechanism are orthogonal to each other, wherein the rotation mechanism is configured to rotate such that, in a replacement state for replacing the first sample container and the second sample container, the translation direction of the first translation mechanism and the translation direction of the second translation mechanism are aligned so that the first translation mechanism and the second translation mechanism move the first sample container and the second sample container in the aligned direction, wherein, in the replacement state, the first sample container and the second sample container are completely exposed from the optical base, and wherein the rotation means comprises a rotating table, and wherein the rotation means is configured to rotate the rotating table by at least 180 degrees to switch positions of the first sample container and the second sample container.

14. The nucleic acid analysis device according to claim 13, wherein the first translation mechanism includes a base portion and a translation table displaced relative to the base portion, the rotation mechanism includes a rotating table rotationally displaced around a rotation center, and the rotating table serves as the base portion of the first translation mechanism.

15. The nucleic acid analysis device according to claim 13, wherein the second translation mechanism includes a translation table displaced relative to a stage base, the rotation mechanism includes a base portion and a rotating table displaced in a rotational direction relative to the base portion, and the translation table of the second translation mechanism serves as the base portion of the rotation mechanism.

16. The nucleic acid analysis device according to claim 13, wherein the first sample container and the second sample container are mounted on a translation table of the first translation mechanism.

17. The nucleic acid analysis device according to claim 16, wherein, during the replacement state, the first sample container and the second sample container are completely exposed from the optical base.

18. The nucleic acid analysis device according to claim 16, wherein the camera captures images of the first sample container and extension and fluorescent labeling reactions are performed on the second sample container.

19. The nucleic acid analysis device according to claim 18, further comprising:

a reagent dispensing nozzle; and an arm portion moving the reagent dispensing nozzle to a desired position.

* * * * *